United States Patent
Pingry et al.

(10) Patent No.: US 11,330,054 B2
(45) Date of Patent: May 10, 2022

(54) SYSTEM AND METHOD FOR LOAD BALANCING IN A DATA STORAGE SYSTEM

(71) Applicant: Zaius, Inc., Leesburg, VA (US)

(72) Inventors: Spencer Eldon Pingry, Leesburg, VA (US); Jonathan Bartholomew Mulieri, Broadlands, VA (US)

(73) Assignee: Episerver Inc., Nashua, NH (US)

( * ) Notice: Subject to any disclaimer, the term of this patent is extended or adjusted under 35 U.S.C. 154(b) by 484 days.

(21) Appl. No.: 16/207,582

(22) Filed: Dec. 3, 2018

(65) Prior Publication Data

US 2019/0173947 A1 Jun. 6, 2019

Related U.S. Application Data

(63) Continuation of application No. 14/562,612, filed on Dec. 5, 2014, now abandoned.

(60) Provisional application No. 61/913,230, filed on Dec. 6, 2013.

(51) Int. Cl.
*G06F 17/00* (2019.01)
*G06F 7/00* (2006.01)
*H04L 67/1097* (2022.01)
*H04L 67/1095* (2022.01)
*G06F 16/27* (2019.01)

(52) U.S. Cl.
CPC ........ *H04L 67/1097* (2013.01); *G06F 16/278* (2019.01); *H04L 67/1095* (2013.01)

(58) Field of Classification Search
CPC ........... G06F 17/30584; H04L 67/1095; H04L 67/1097

USPC .......................................................... 707/803
See application file for complete search history.

(56) References Cited

U.S. PATENT DOCUMENTS

| | | | | |
|---|---|---|---|---|
| 6,169,989 B1 * | 1/2001 | Eichstaedt | ......... | G06Q 30/0283 |
| 6,256,675 B1 * | 7/2001 | Rabinovich | ............. | H04L 29/06 |
| | | | | 709/225 |
| 6,502,103 B1 * | 12/2002 | Frey | ........................ | G06F 9/465 |
| 6,779,093 B1 * | 8/2004 | Gupta | ................... | G06F 16/273 |
| | | | | 711/162 |
| 6,970,987 B1 * | 11/2005 | Ji | ........................ | G06F 11/1076 |
| | | | | 711/162 |
| 7,613,947 B1 * | 11/2009 | Coatney | .............. | G06F 11/0727 |
| | | | | 714/6.1 |
| 7,693,960 B1 * | 4/2010 | Harman | .............. | H04L 67/1097 |
| | | | | 709/218 |
| 7,827,146 B1 * | 11/2010 | De Landstheer | ... | G06F 11/1458 |
| | | | | 707/651 |
| 7,904,649 B2 * | 3/2011 | Jernigan, IV | ......... | G06F 3/0644 |
| | | | | 711/114 |

(Continued)

*Primary Examiner* — Pavan Mamillapalli
(74) *Attorney, Agent, or Firm* — Toering Patents PLLC

(57) ABSTRACT

Various implementations of the invention provide load balancing in a data storage system. A computing processor receives a request to create a new data storage container on a selected one of a plurality of data storage assets, where each of the plurality of data storage assets is configured to host a plurality of data storage containers. The computing processor determines which of the plurality of data storage assets is farthest away from an existing data storage container corresponding to the new data storage container and creates the new data storage container on the data storage asset that is farthest away from the existing data storage container.

13 Claims, 8 Drawing Sheets

(56) References Cited

U.S. PATENT DOCUMENTS

| | | | | |
|---|---|---|---|---|
| 8,555,018 B1* | 10/2013 | Rohr | | G06F 3/0649 |
| | | | | 711/165 |
| 8,650,270 B2* | 2/2014 | Gerovac | | G06F 9/52 |
| | | | | 709/223 |
| 9,201,610 B2* | 12/2015 | Wofford, IV | | G06F 16/25 |
| 9,607,072 B2* | 3/2017 | Bunnell | | G06F 16/28 |
| 9,740,421 B2* | 8/2017 | Levy | | G06F 3/0605 |
| 2002/0103907 A1* | 8/2002 | Petersen | | G06F 11/1464 |
| | | | | 709/226 |
| 2002/0143798 A1* | 10/2002 | Lisiecki | | H04L 67/1008 |
| 2003/0084076 A1* | 5/2003 | Sekiguchi | | H04L 69/40 |
| | | | | 707/999.205 |
| 2003/0110183 A1* | 6/2003 | Gleitman | | G01V 1/28 |
| 2003/0217005 A1* | 11/2003 | Drummond | | G06Q 30/06 |
| | | | | 705/43 |
| 2004/0093555 A1* | 5/2004 | Therrien | | G06F 11/1464 |
| | | | | 714/805 |
| 2005/0044170 A1* | 2/2005 | Cox | | H04L 29/06 |
| | | | | 709/217 |
| 2005/0097285 A1* | 5/2005 | Karamanolis | | G06F 12/12 |
| | | | | 711/159 |
| 2006/0029125 A1* | 2/2006 | Kobashi | | G06F 40/197 |
| | | | | 375/222 |
| 2006/0136354 A1* | 6/2006 | Bell | | G06F 16/2471 |
| 2007/0112890 A1* | 5/2007 | Murase | | G06F 16/93 |
| 2008/0126404 A1* | 5/2008 | Slik | | G06F 16/1774 |
| | | | | 707/999.103 |
| 2010/0023722 A1* | 1/2010 | Tabbara | | H04L 43/00 |
| | | | | 711/170 |
| 2011/0246732 A1* | 10/2011 | Amano | | G06F 11/1464 |
| | | | | 711/162 |
| 2012/0084383 A1* | 4/2012 | Bernbo | | G06F 15/17331 |
| | | | | 709/213 |
| 2012/0166611 A1* | 6/2012 | Kim | | H04L 67/28 |
| | | | | 709/223 |
| 2012/0173486 A1* | 7/2012 | Park | | H04L 67/1097 |
| | | | | 707/634 |
| 2012/0310939 A1* | 12/2012 | Lee | | G06F 16/285 |
| | | | | 707/739 |
| 2013/0054932 A1* | 2/2013 | Acharya | | G06F 3/067 |
| | | | | 711/202 |
| 2013/0055248 A1* | 2/2013 | Sokolinski | | H04L 67/1097 |
| | | | | 718/1 |
| 2013/0110778 A1* | 5/2013 | Taylor | | G06F 11/1435 |
| | | | | 707/624 |
| 2013/0198424 A1* | 8/2013 | Randhawa | | G06F 13/14 |
| | | | | 710/74 |
| 2015/0046407 A1* | 2/2015 | Kalas | | G06F 11/1004 |
| | | | | 707/691 |

* cited by examiner

SYSTEM AND METHOD FOR LOAD BALANCING IN A DATA STORAGE SYSTEM

CROSS-REFERENCE TO RELATED APPLICATIONS

This Application is a continuation application of U.S. patent application Ser. No. 14/562,612, which was filed on Dec. 5, 2014; which in turn claims priority to U.S. Provisional Patent Application No. 61/913,230, which was filed on Dec. 6, 2013. Each of the foregoing applications is incorporated herein by reference as if reproduced below in its entirety.

FIELD OF THE INVENTION

The invention is generally related to data storage and more particularly, to a highly scalable, highly available online data storage system.

BACKGROUND OF THE INVENTION

Various conventional data storage systems attempt to manage both scalability and availability of online data storage assets. However, these conventional data storage systems typically are either overly complex or dramatically over specify the number of data storage assets required by the system.

Furthermore, these conventional data storage systems are typically cumbersome to query, particularly when configured to optimize aspects of the data storage system rather than ease of querying.

What are needed are improved systems and methods for storing and retrieving data, especially in an online, real-time data storage system. What are further needed are such systems that are optimized for various forms of querying.

SUMMARY OF THE INVENTION

In various implementations of the invention, a method for load balancing in a data storage system receives, via a computing processor, a request to create a new data storage container on a selected one of a plurality of data storage assets, wherein each of the plurality of data storage assets is configured to host a plurality of data storage containers; determines which of the plurality of data storage assets is farthest away from an existing data storage container corresponding to the new data storage container; and creates the new data storage container on the data storage asset that is farthest away from the existing data storage container.

These implementations, their features and other aspects of the invention are described in further detail below.

DETAILED DESCRIPTION

Figure 1:
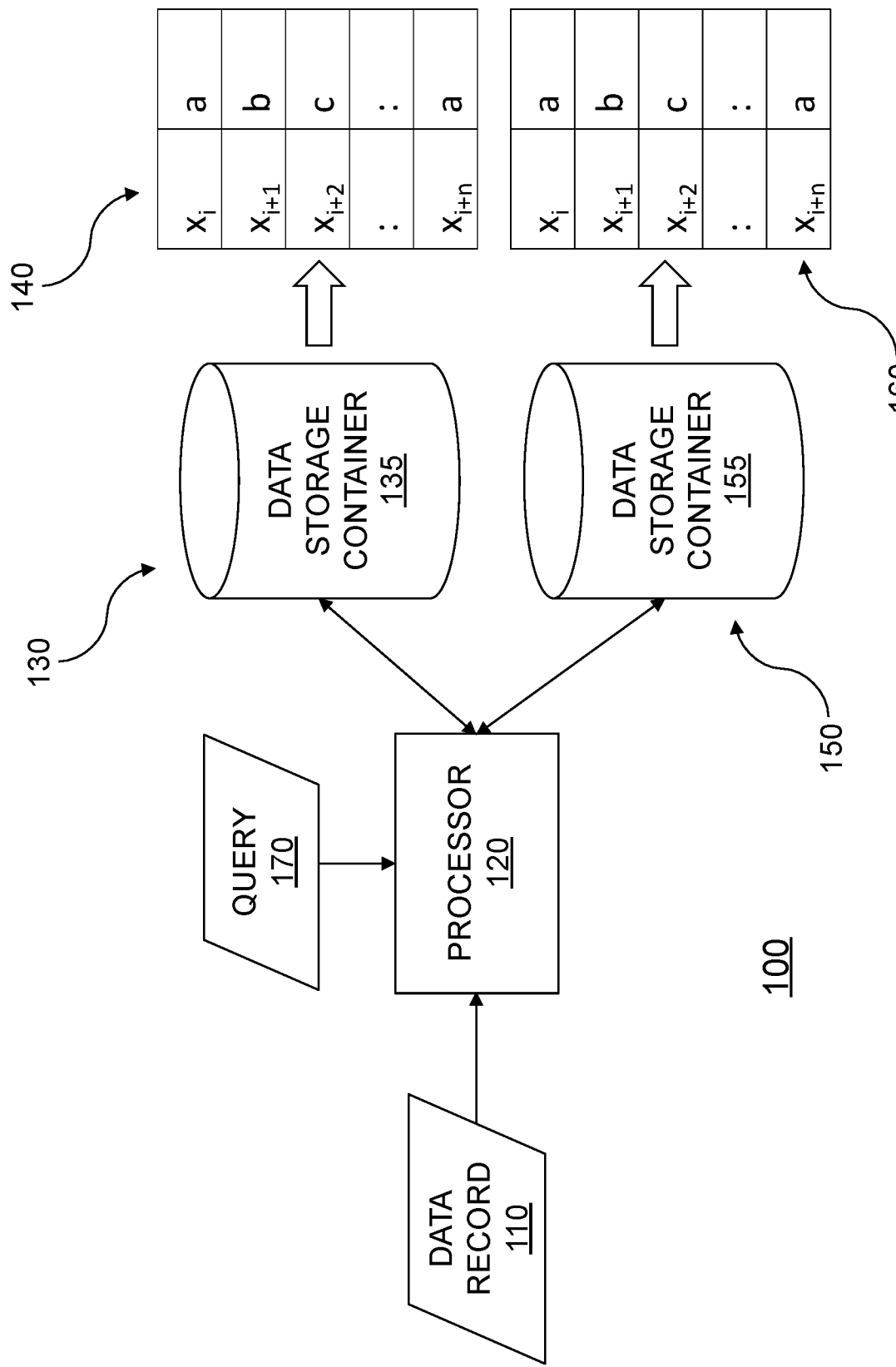
FIG. 1 illustrates a data storage system according to various implementations of the invention.

FIG. 1 illustrates a data storage system 100 according to various implementations of the invention. Data storage system 100 includes a processor 120 and at least two data storage containers, illustrated in FIG. 1 as a first data storage container 135 in a first data storage space 130 and a second data storage container 155 in a second data storage space 150. According to various implementations of the invention, a data record 110 is stored in both first data storage container 135 and second data storage container 155 based on one or more data values in data record 110 as will be described in further detail below. Data storage containers 135, 155 and data storage spaces 130, 150 refer to logical data storage elements which may be stored on one or more physical data storage assets (not otherwise illustrated in FIG. 1). According to various implementations of the invention, physical data storage assets may include, but are not limited to servers, disks, memories, other non-transitory computer readable media, or other physical data storage assets including banks or farms of such physical data storage assets.

According to various implementations of the invention, processor 120 may be any general purpose hardware computing processor configured via various executable programming instructions stored internally to or externally from processor 120 in a computer readable medium, where when such programming instructions are executed by the computing processor, they cause the computing processor to perform various functions as would be appreciated. When configured with such programming instructions, the general purpose hardware computing processor becomes a particular processor that performs functions attributed to processor 120 as described herein. According to various implementations of the invention, processor 120 may be a single hardware computing processor or a plurality of hardware computing processors. According to various implementations of the invention, processor 120 may be a dedicated hardware computing processor configured to perform various functions of processor 120 as described herein or a plurality of hardware computing processors distributed throughout data storage system 100, each configured to perform one or more of the functions of processor 100 as described herein.

According to various implementations of the invention, first data storage space 130 and second data storage space 150 define separate spaces for aggregating, organizing and storing data records in a manner that optimizes responses to queries that may be applied against the data records in the respective data storage spaces 130, 150. According to various implementations of the invention, first data storage space 130 aggregates, organizes and/or stores data records in data storage container 135 based on a sequentially changing data value in each of the data records. Such sequentially changing data value may be a sequentially increasing data value or a sequentially decreasing data value. In some implementations of the invention, data records with sequentially increasing data values are stored in increasing sequential order; and data records with sequentially decreasing data values are stored in decreasing sequential order. This first data storage space is sometimes referred to as a "sequential data storage space," or as will become apparent below, a "spill space."

For example, a date-time stamp in a data record is a sequentially increasing data value—date-time stamps in data records will have progressively greater data values over time. Other sequentially increasing data values may include, but are not limited to, other temporal data values (i.e., time-based data values other than date-time stamps), transaction numbers, order numbers, or similar numeric orderings of data values in the data records, or other sequentially increasing data values.

According to various implementations of the invention, second data storage space 150 aggregates, organizes and/or stores data records in data storage container 155 based on a data value in the data record that resides in a "finite" space, and not "infinite" such as the sequentially changing data value. For example, a social security number is a data value that resides in a finite space as it has a finite range of values, namely 000-00-0000 to 999-99-9999. As another example, a last name stored as alphabetic characters in a fixed data field (e.g., 15 characters wide, etc.) is a data value that resides in a finite space as it has a finite range of values, namely "A" to "ZZZZZZZZZZZZZZZ." As another example, a hash function computes a hash value based on one or more data values in a data record; the hash value typically has a fixed number of bits and hence resides in a finite space as would be appreciated. This second data storage space is sometimes referred to as a "finite data storage space," or as will become apparent below, a "split space."

In some implementations of the invention, second data storage space 150 aggregates, organizes and/or stores data records in data storage container 155 based on those data records sharing a common data value (or sharing a common range of data values) that resides in the finite space such as, but not limited to, those data records sharing the same user name, social security number, website visited, or other common data value in the finite space. In some implementations of the invention, second data storage space 150 aggregates, organizes and/or stores data records that share the common data value (or common range of data values) in data storage container 155 based on an ordering of another data value in the data record, typically, a date-time stamp (or similar time-based value), although any other ordering may be used as would be appreciated.

For example, data records 140 stored in data storage container 135 are organized based on sequentially increasing data values $x_i, x_{i+1}, x_{i+2}, \ldots x_{i+n}$ in first data storage space 130. In other words, $x_i < x_{i+1} < x_{i+2} < \ldots < x_{i+n}$. As illustrated, each data record in plurality of data records 140 also includes a data value that is not a sequentially increasing data value (e.g., as illustrated, 'a', 'c' . . . ). In some implementations, data records 140 in data storage container 135 are ordered strictly based on the sequentially increasing data values. In some implementations, data records 140 in data storage container 135 are ordered loosely based on the sequentially increasing data values based on when such data records are received and stored; in other words, some of the data records 140 may be received "out of order" such that the data record having the data value $x_{i+2}$ is stored in the data base within a few records before the data record having the data value $x_{i+1}$. In some implementations of the invention, this minor misordering is tolerated because "append" operations require less processing than "insert" operations as would be appreciated and can be addressed when responding to queries. In some implementations, data records 140 received out of order are re-ordered, either periodically, or as they are received, as would be appreciated.

According to various implementations of the invention, data records 160 stored in data storage container 155 are organized based on a common data value or common range of data values in the finite space of second data storage space 150. In some implementations, data records 160 are ordered based on the common data value or within the common range of data values. In these implementations, the data records may be ordered, for example, alphabetically or following some other ordering. In some implementations of the invention, data records 160 are ordered based on when such data records are received. In these implementations, the data records are ordered based on their receipt by data storage system 100 and not necessarily following some other ordering.

One benefit of various implementations of the invention is that having and maintaining separate data storage containers 135, 155 from separate data storage spaces 130, 150, respectively, improves response to different types of queries. For example, when the sequentially changing data value of first data storage container 135 is a date-time stamp, data storage container 135 more readily services temporal-based queries. More particularly, data records before or after a certain time or within or outside of a certain time range are more readily made against a data storage that organizes its data records based on time. In essence, data storage container 135 is "tuned" to temporal-base queries. While the same query could be made against data storage container 155, such a query would undoubtedly take longer to service as each data record would have to be evaluated based on the temporal based query. Similarly, when the other data value is, for example, a user name, and data storage container 155 stores its plurality of data records 160 based on user name, data queries based on user name are more readily serviced by such data storage container 155 as would be appreciated.

In some implementations of the invention, data storage system 100 includes a plurality of data storages 135 in different data storage spaces 130 to aggregate, organize and/or store data records based on one or more different sequentially changing data value(s) in the data records. In some implementations of the invention, data storage system 100 includes a plurality of data storages 155 in different data storage spaces 150 to aggregate, organize and/or store data records based on the one or more different data value(s) in the data records, where such different data value(s) reside in a finite data space. In some implementations, the number and/or characteristics of data storages 135, 155 may be selected based on the expected types of queries applied against data storage system 100 as would be appreciated.

According to various implementations of the invention, processor 120 receives a query 170 from, for example, a user of data storage system 100. According to various implementations of the invention, processor 120 determines which data storage space 130, 150 would be best to respond to query 170. For example, if query 170 is based on a sequentially changing data value such as a date-time stamp, for example, query 170 may be applied against first data storage container 135. If query 170 is based on a data value in a finite data space such as a hash value, query 170 may be applied against second data storage container 155, for example.

Figure 2:
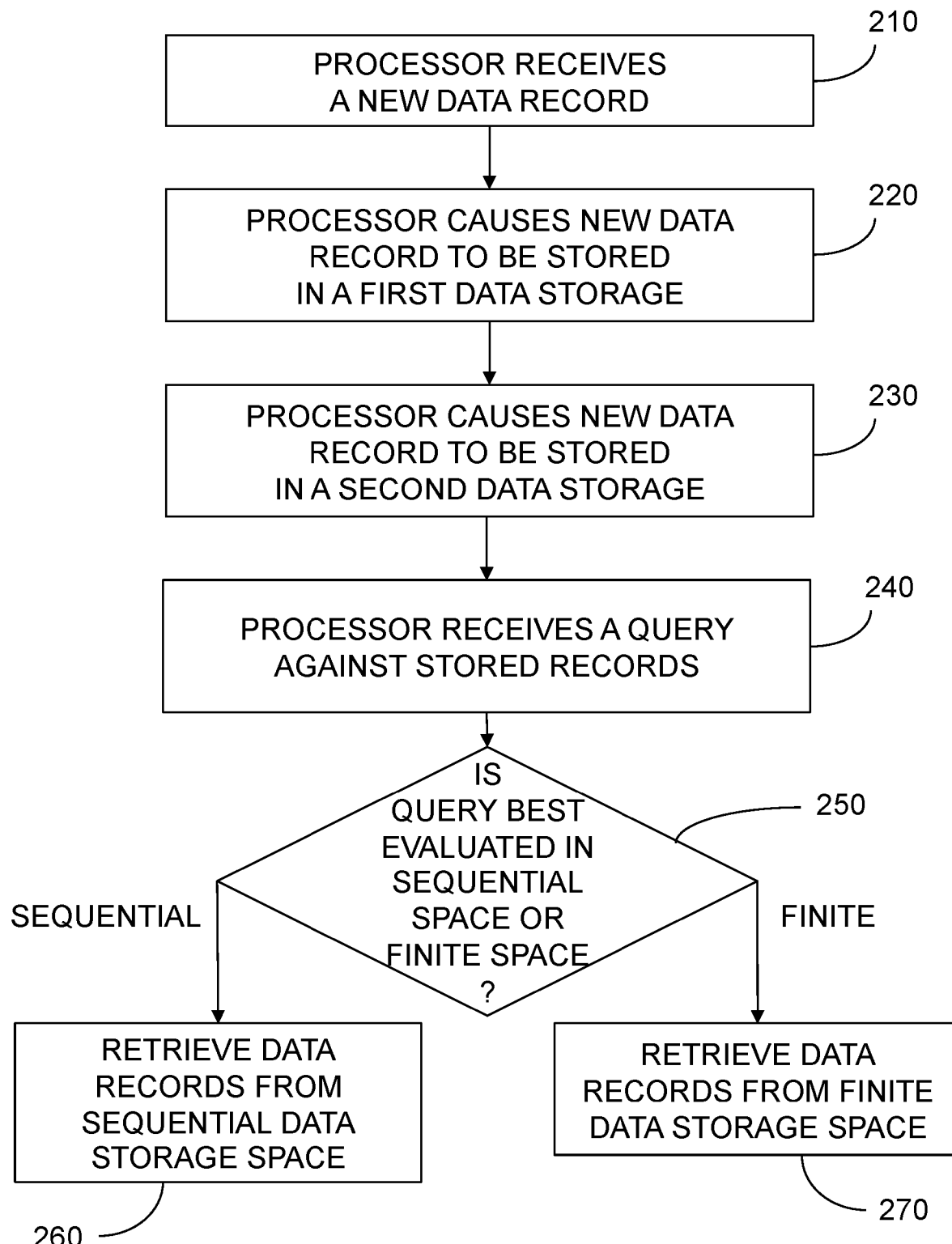
FIG. 2 illustrates an operation of a data storage system according to various implementations of the invention.

FIG. 2 illustrates an operation 200 of data storage system 100 according to various implementations of the invention. In an operation 210, processor 120 receives new data record 110. In an operation 220, processor 120 causes new data record 110 to be stored in data storage container 135 in first data storage space 130. In an operation 230, processor 120 causes new data record 110 to be stored in data storage container 155 in second data storage space 150. In an operation 240, query 170, which is to be applied against data storage system 100, is received. A decision operation 250 determines whether query 170 is best evaluated in the sequential data storage space or in the finite data storage space. If query 170 is best evaluated in the sequential data storage space, in an operation 260, query 170 is applied against data storage container 135 in first data storage space 130 and a retrieved plurality of data records corresponding to query 170 is retrieved from data storage container 135. If query 170 is best evaluated in the finite data storage space, in an operation 270, query 170 is applied against data storage container 155 in second data storage space 150 and a retrieved plurality of data records corresponding to query 170 is retrieved from data storage container 155.

Figure 3:
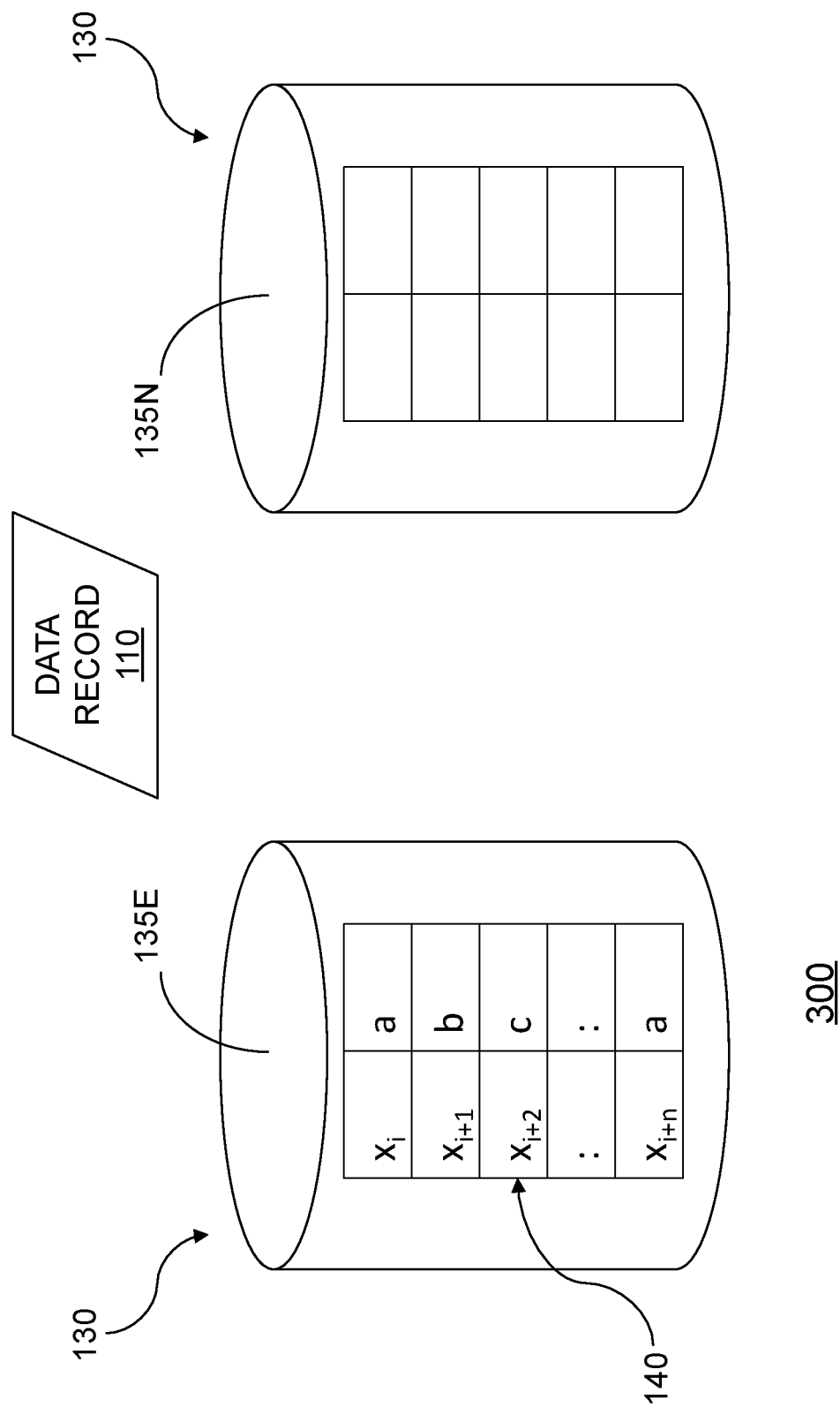
FIG. 3 illustrates a spill mechanism over to a new data storage container once an existing data storage container reaches its capacity according to various implementations of the invention.

As new data records are added to data storage system 100, data storage containers 135, 155 may eventually reach their respective capacities. Some implementations of the invention provide a mechanism for handling additional new records as data storage containers 135, 155 approach their respective capacities. In reference to FIGS. 3, 4 and 5 and in accordance with various implementations of the invention, new data storage containers 135N, 155N are created, opened or otherwise brought on-line in data storage system 100 based on whether existing data storage container 135E, 155E that is approaching capacity corresponds to first data storage space 130 or second data storage space 150.

According to various implementations of the invention, data storage containers 135, 155 typically have a predetermined capacity, either physically or logically, as would be appreciated. For example, each data storage container 135, 155 may store twenty (20) million data records or other number of data records. When an existing data storage container 135E, 155E fills, a new data storage container 135N, 155N must be brought online (e.g., created, instantiated, etc.) to aggregate, organize and store new data records.

According to various implementations of the invention, when data storage container 135E reaches its capacity (i.e., at capacity, within a certain threshold of its capacity, etc.), a new data storage container 135N is brought online to store additional new data records. Because data records in data storage space 130 are stored sequentially based on a data value in the data record, the new data record (and each subsequent one thereafter until the new data storage container 135N reaches its capacity) is simply stored in the new data storage container 135N. According to various implementations of the invention, when data storage container 135E reaches its capacity, the new data record in data storage space 130 "spills" into a new data storage container 135N.

Figure 4:
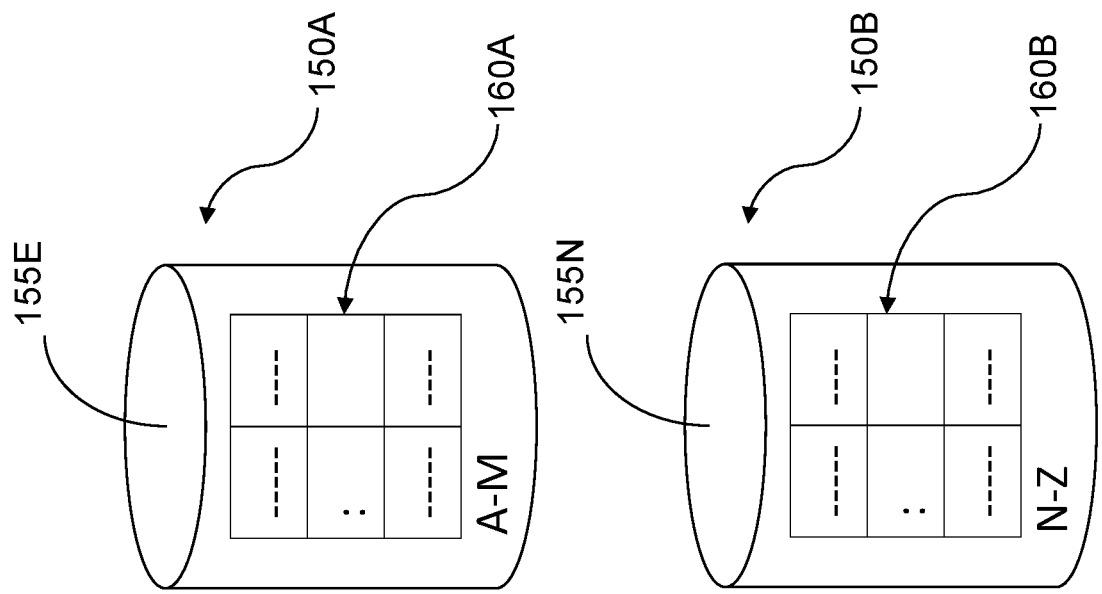
FIGS. 4 and 5 illustrate a split mechanism over to one or more new data storage container(s) once an existing data storage container reaches its capacity according to various implementations of the invention.
Figure 4:
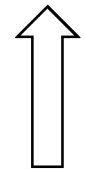
Figure 4:
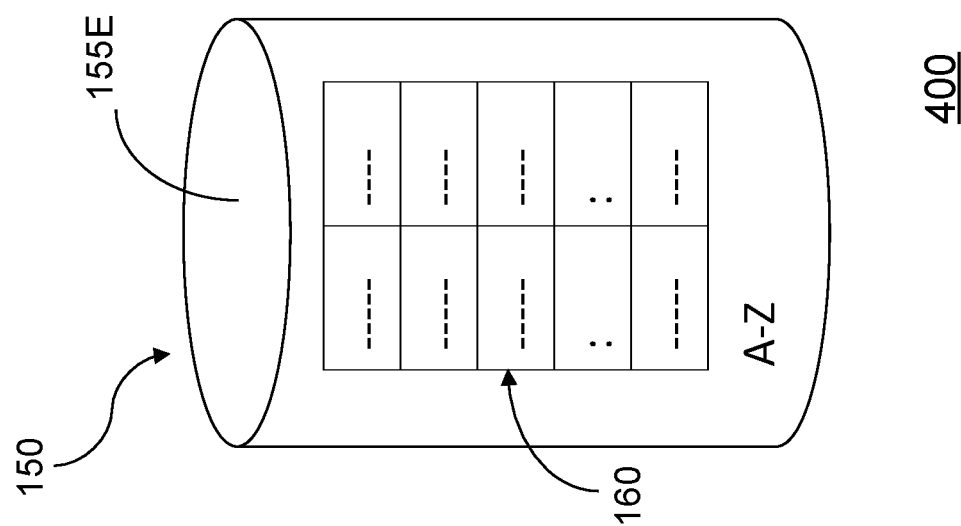
Figure 5:
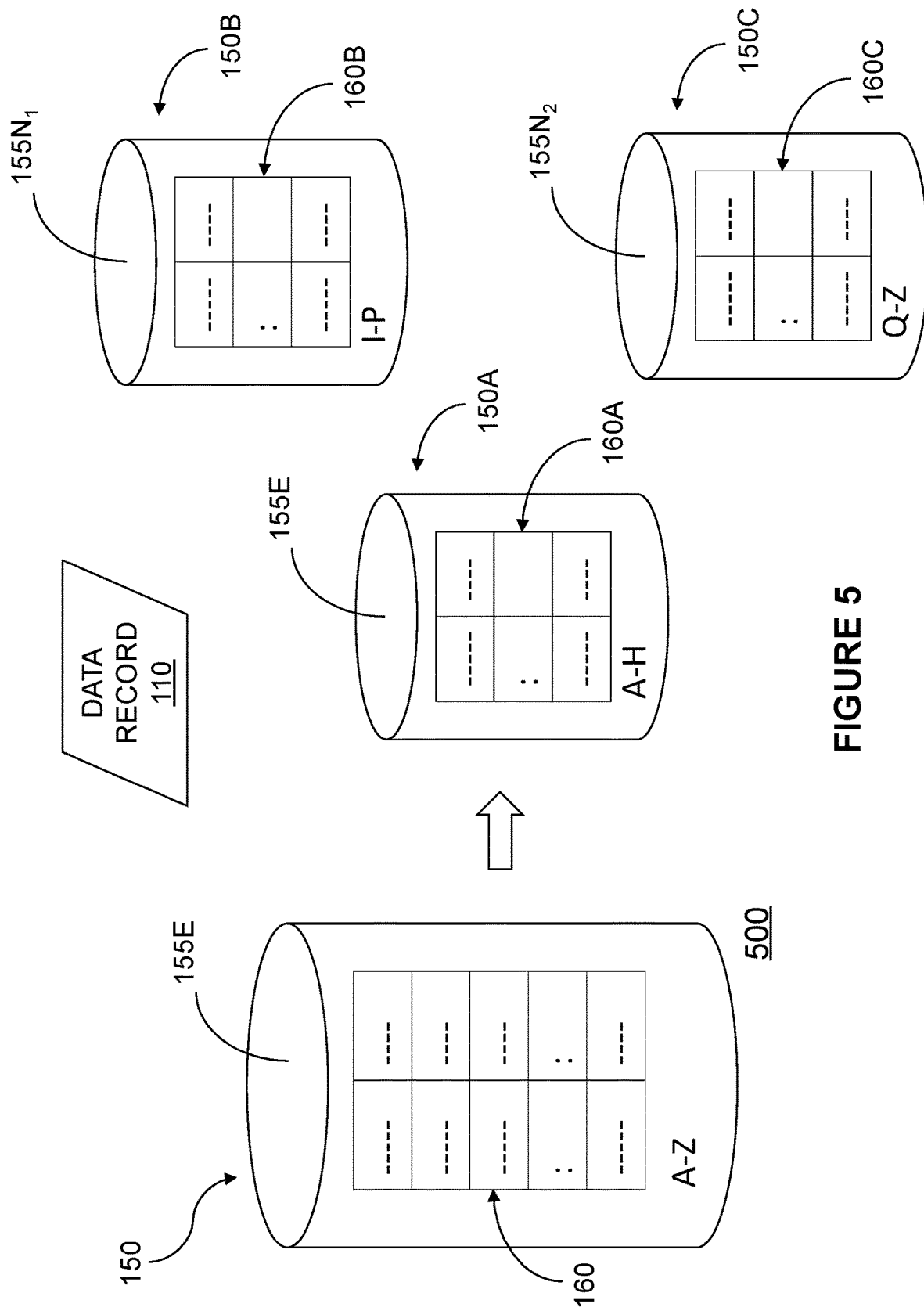

According to various implementations of the invention, when existing data storage container 155E reaches its capacity, one or more new data storage containers 155N are brought online to accommodate the new data records. Because data records in data storage space 150 are based on data values in the data record that reside in a finite data space, the finite data space is "split" into one or more contiguous "subspaces," each of which is stored in its own data storage container 155E, 155N. For example, if existing data storage container 155E presently stores data records based on a user last name and the entire finite space resides in data storage container 155 (i.e., last names beginning with 'A' to 'Z'), the entire finite space is split, into one or more contiguous subspaces. For example, as illustrated in FIG. 4, if the finite space is split into two subspaces (illustrated as a subspace 150A and a subspace 150B), data records 160A having user last names beginning with 'A' to 'M' might be stored on the existing data storage container 155E and data records 160B having user last names beginning with 'V' to 'Z' might be stored on the new data storage container 155N. In another example illustrated in FIG. 5, if the finite space is split into three contiguous subspaces (illustrated as a subspace 150A, a subspace 150B, and a subspace 150C), data records 160A having user last names beginning with 'A' to 'H' might be stored on the existing data storage container 155E, data records 160B having user last names beginning with 'I' to 'P' might be stored on a first new data storage container $155N_1$, and data records 160C having user last names beginning with 'Q' to 'Z' are stored on a second new data storage container $155N_1$. In some implementations of the invention, other numbers of subspaces may be used as well as different partitions for the subspaces. In some implementations, the data storage containers 155E, $155N_i$, and their respective subspaces themselves may be further partitioned as they reach their respective capacities into one or more sub-subspaces as would be appreciated. According to various implementations of the invention, when data storage container 155 reaches its capacity, the new data record forces data storage space 150 may be "split" into one or more data storage subspaces 150, each stored in a separate data storage container 155 as would be appreciated.

In some implementations of the invention, in order to accommodate a split of a data storage space 150 into one or more subspaces, each residing in a separate data storage container 155E, $155N_i$, each of the data records 160 in the existing data storage container 155 is positioned or moved to the appropriate data storage container 155E, $155N_i$, after the data storage space 150 is split into one or more subspaces as discussed above.

Figure 6:
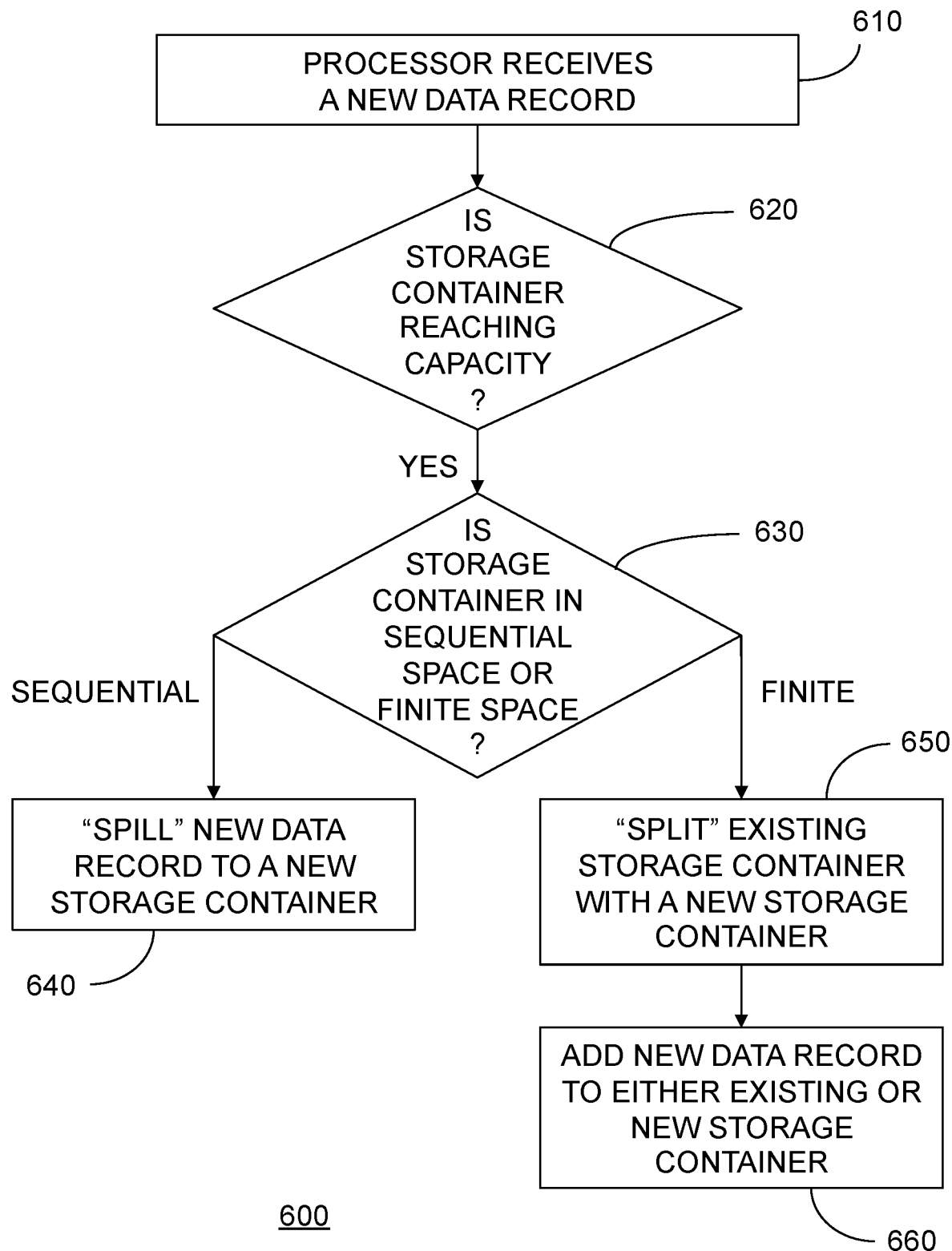
FIG. 6 illustrates an operation of a data storage system as data storage containers approach capacity according to various implementations of the invention.

FIG. 6 illustrates an operation of a data storage system as data storage containers approach capacity according to various implementations of the invention. In an operation 610, data storage system 100 receives a new data record 110 to be stored in one or more data storage containers 135E, 155E. In a decision operation 620, data storage system 100 determines whether a particular data storage container 135E, 155E is at capacity. In a decision operation 630, data storage system 100 determines whether the particular data storage container 135E, 155E stores data records based on a sequentially changing data value in the data records (i.e., a "spill" storage container) or whether the particular data storage container 135E, 155E stores data records based on a data value residing in a finite data space (i.e., a "split" storage container). If the particular data storage container 135E, 155E is a "spill" storage container, in an operation 640, new data record "spills" over to a new data storage container 135N. If the particular data storage container 135E, 155E is a "split" storage container, in an operation 650, the plurality of stored data records 160 in existing data storage container 155E is "split" with new data storage container 155N and in an operation 660, new data record 110 is added to either existing data storage container 155E or new data storage container 155N as discussed above.

Figure 7:
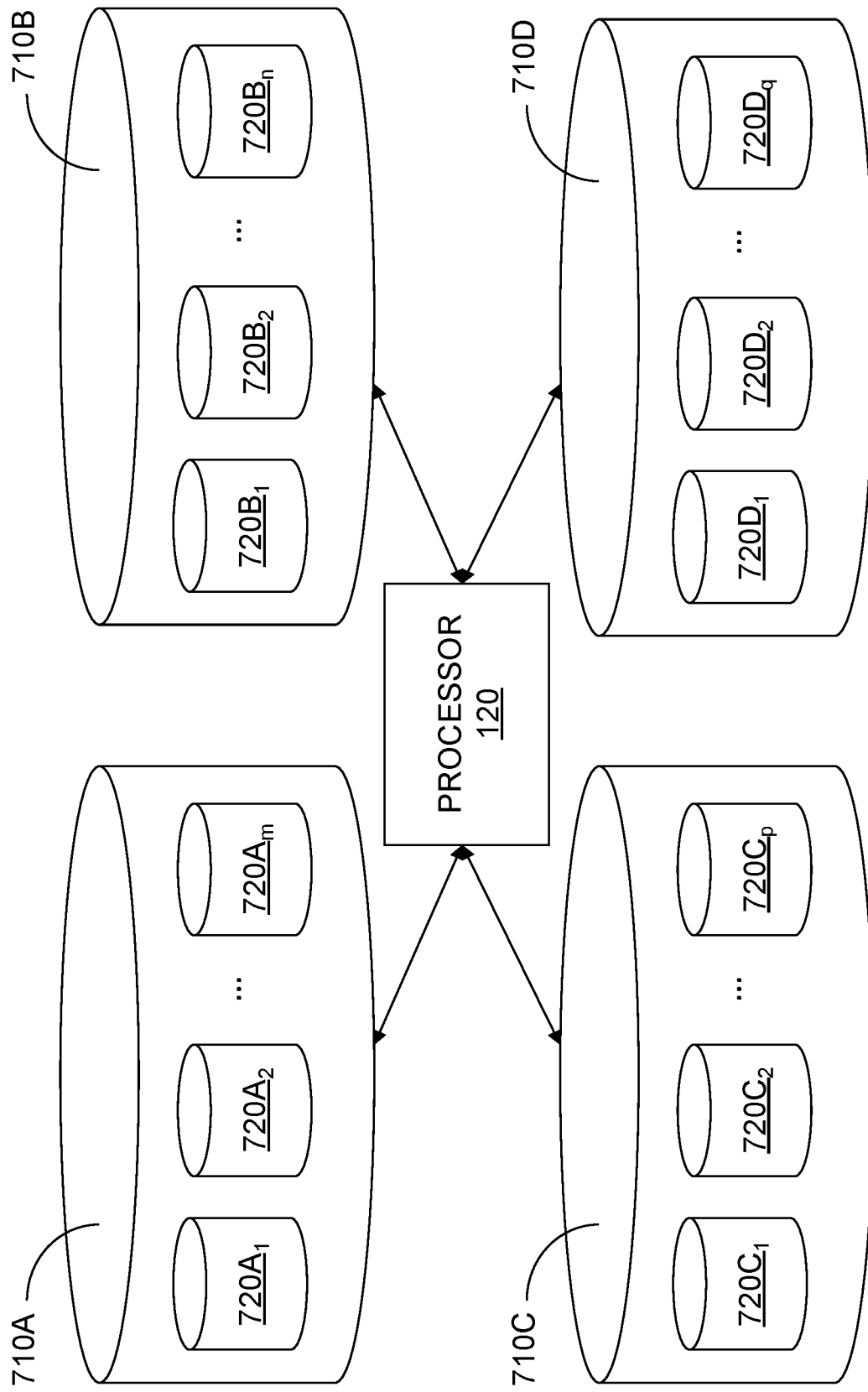
FIG. 7 illustrates a data storage system including a number of data storage containers hosted by a number of data storage assets according to various implementations of the invention.

According to various implementations of the invention, data storage system 100 may provide a load balancing mechanism for distributing data storage containers 135E, 135N, 155E, and 155N; across a plurality of data storage assets. FIG. 7 illustrates data storage system 100 in different detail for purposes of describing this load balancing mechanism in accordance with various implementations of the invention. Data storage system 100 includes processor 120 and a plurality of data storage assets 710 (illustrated as a data storage asset 710A, a data storage asset 710B, a data storage asset 710C, and a data storage asset 710D). As discussed above, each data storage asset 710 comprises physical hardware configured to host one or more data storage containers 720 (illustrated in FIG. 7 as data storage asset 710A hosting a data storage container $720A_1$, a data storage container $720A_2$, . . . and a data storage container $720A_m$; data storage asset 710B hosting a data storage container $720B_1$, a data storage container $720B_2$, . . . and a data storage container $720B_n$; data storage asset 710C hosting a data storage container $720C_1$, a data storage container $720C_2$, . . . and a data storage container $720C_p$; and data storage asset 710D hosting a data storage container $720D_1$, a data storage container $720D_2$, . . . and a data storage container $720D_q$). Data storage containers 720 collectively refer to the various data storage containers 135 (including data storage containers 135N and data storage containers 135E) and data storage containers 155 (including data storage containers 155N and data storage containers 155E) described above.

According to various implementations of the invention, data storage system 100 distributes data storage containers 720 across data storage assets to provide high availability to data records 110 stored in data storage containers 720 and/or to provide fast response time to queries made against these data records 110. According to various implementations of the invention, data storage system 100 provides high availability and fast response time to a plurality of customers spread across data storage assets 710 without having to dedicate individual data storage assets to a given customer. By spreading out data records across data storage assets 710, queries may become highly parallelized thereby reducing response time to the queries while simultaneously reducing an overall number of data storage assets 710 required by data storage system to meet a given performance level.

According to various implementations of the invention, each data storage container 720 may have one or more corresponding replica data storage container (not otherwise illustrated) that mirrors data storage container 720 for purposes of redundancy and backup. In some implementations, replica data storage containers may also be used to provide further parallelization of data storage system 100. In other words, replica data storage containers may be used to directly respond to the query, or portions of the query, to increase the number of potential data storage assets 710 responding to the query. This ensures that if the data storage asset 710 hosting a particular data storage container 720 is busy responding to an unrelated query, the data storage asset 710 hosting a replica of the particular data storage container 720 may respond to the query. In some implementations of the invention, each data storage container 720 is associated with one replica data storage container. In some implementations of the invention, each data storage container is associated with two or more replica data storage containers. According to various implementations of the invention, a number of replicas utilized by data storage system 100 is based, in part, on necessary performance requirements of data storage system 100 and costs of data storage assets 710 as would be appreciated. For purposes of this description, data storage containers and replica data storage containers operate within data storage system 100 in a similar manner. In other words, no distinction is made by data storage system 100 as to whether any given data storage container 720 is a replica, and for purposes of this description, data storage containers and their replicas are referred to collectively as data storage containers 720.

In order to be highly available and highly scalable, data storage system 100 may distribute data storage containers 720 across data storage assets 710. When a request to create, instantiate, or otherwise bring online, a new data storage container 720 (such as discussed above with regard to new data storage containers 135N, 155N), data storage system 100, via processor 120, determines which of data storage assets 710 hosts data storage containers 720 that are "farthest away" from the data storage container 720 that reached its capacity (i.e., data storage container 135E, 155E). This ensures that a given data storage asset 710 does not host contiguous data storage containers 720. In other words, a new data storage container 720 should preferably not be hosted by the same data storage asset 710 as the existing data storage container 720. Likewise, a data storage container 720 and its replica should preferably not be hosted together by the same data storage asset 710.

In some implementations of the invention, the data storage asset 710 deemed "farthest away" may be selected by determining which data storage asset 710 hosts "the farthest of the closest" data storage container 720 (described in further detail below). In some implementations of the invention, the data storage asset 710 deemed "farthest away" may be selected by determining which data storage asset 710 hosts the fewest number of data storage containers 720 or that hosts the least amount of data or data records 110. Other mechanisms for determining which data storage asset 710 is deemed "farthest away" may be used as would be appreciated.

In some implementations of the invention, additional information based on the data records 110 and/or data storage containers 720 is used to determine which data storage asset 710 is deemed "farthest away." For example, in some implementations where data storage system 100 hosts data for two or more customers, the data storage asset 710 deemed "farthest away" is determined relative to data storage containers 720 for the relevant customer. This ensures that a given customers' data records 110 (and their data storage containers 720) are distributed throughout data storage system 100. Thus, in some implementations of the invention, the data storage asset 710 deemed "farthest away" may be selected by determining which data storage asset 710 hosts "a farthest of the closest" data storage containers 720 for the particular customer. Similarly, in some implementations of the invention, the data storage asset 710 deemed "farthest away" may be selected by determining which data storage asset 710 hosts the fewest number of data storage containers 720 for the particular customer or that hosts the least amount of data or data records 110 for the particular customer.

Determining which data storage asset 710 is deemed "farthest away" may rely on other information from data records 110 in addition to or instead of the particular customer associated with the data records 110 as in the example described above. Such information may include, but is not limited to, a buyer, a website host, a website owner, a website user, or other information by which data records 110 can be discriminated.

In some implementations of the invention, determining which data storage asset 710 is deemed "farthest away" may rely on whether data storage container 720 is a split space data storage container or a spill space data storage container. For example, in some implementations of the invention, the data storage asset 710 deemed "farthest away" from an existing split space data storage container 720 (i.e., data storage container 155E) may be selected by determining which data storage asset 710 hosts the fewest number of data storage containers 720 or stores the least amount of data or data records 110; whereas the data storage asset 710 deemed "farthest away" from an existing spill space data storage container (i.e., data storage container 135E) may be selected by determining which data storage asset 710 hosts the farthest of the closest data storage container 720.

As referenced above, the data storage asset 710 deemed "farthest away" may be selected by determining which data storage asset 710 hosts "the farthest of the closest" data storage container 720. In some implementations of the invention, this may be accomplished by first determining, for each of data storage assets 710, which data storage container 720 hosted on the respective data storage asset 710 is closest, in terms of sequential range, to the existing data storage container 720.

In some implementations of the invention, each data storage container in a sequential data storage space stores a sub-range of the data values in the sequential data space. These sub-ranges are more or less "distant" from the sub-range of the existing storage container 720 (for example, by the sum of the sub-ranges that lie in between). In this context, in some implementations of the invention, the data storage containers 720 on each data storage asset 710 are ordered based on the relative "distance" of their respective sub-ranges to that of the existing data storage container 720 from closest to farthest. More specifically, data storage containers $720A_1$, $720A_2$, ..., and $720A_m$ hosted on data storage asset 710A are ordered based on the distance between their respective sub-ranges and that of the existing data storage container from closest to farthest; data storage containers $720B_1$, $720B_2$, ..., and $720B_n$ hosted on data storage asset 710B are ordered based on the distance between their respective sub-ranges and that of the existing data storage container from closest to farthest; data storage containers $720C_1$, $720C_2$, ..., $720C_p$ hosted on data storage asset 710C are ordered based on the distance between their respective sub-ranges and that of the existing data storage container from closest to farthest; and data storage containers $720D_1$, $720D_2$, ..., $720D_q$ hosted on data storage asset 710D are ordered based on the distance between their respective sub-ranges and that of the existing data storage container from closest to farthest. In some implementations of the invention, once the closest data storage container 720 to the existing data storage container is determined for each data storage asset 710, the farthest of these from the existing data storage container is then determined. Then, in some implementations of the invention, the data storage asset 710 that hosts the farthest of the closest data storage containers may be selected to host the new data storage container 720 and a new data storage container 720 may be created on the selected data storage asset 710.

In some implementations of the invention, two or more data storage assets 710 may be determined as hosting the farthest of the closest data storage container 720. In such situations, the data storage asset 710 that stores the least amount of data or data records, or that hosts the fewest number of data storage containers 720 is determined between these two or more data storage assets 710. Then, in some implementations of the invention, the data storage asset 710 that stores the least amount of data or data records, or that hosts the fewest number of data storage containers 710 may be selected to host the new data storage container 720 and a new data storage container 720 may be created on the selected data storage asset 710.

In some implementations of the invention, two or more data storage assets 710 may be determined as storing the least amount of data or data records 110, or that host the fewest number of data storage containers. In such situations, any one of the data storage assets 710 may be selected to host the new data storage container 720 and a new data storage container 720 may be created on the selected data storage asset 710.

Figure 8:
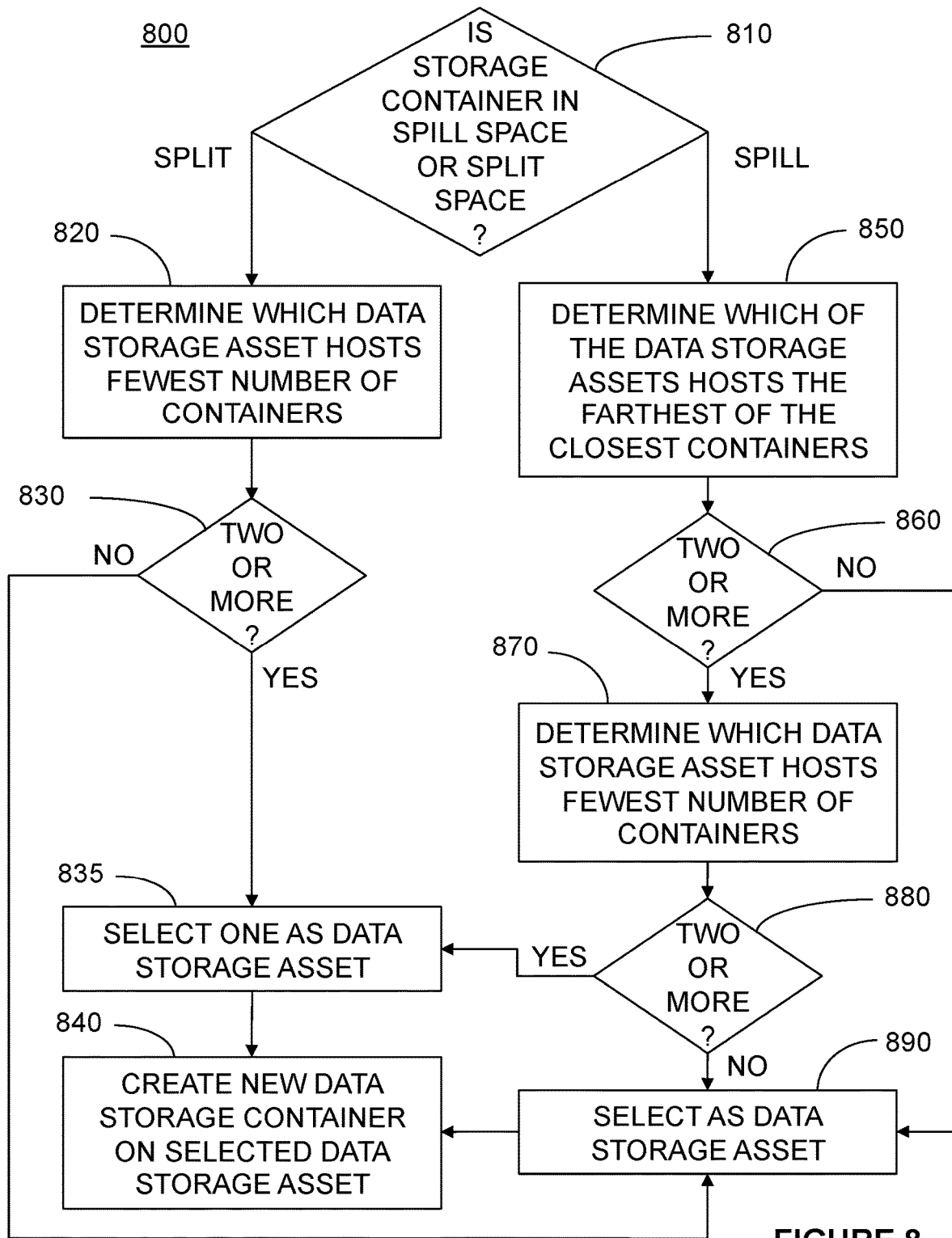
FIG. 8 illustrates an operation of a load balancing mechanism for data storage system according to various implementations of the invention.

FIG. 8 illustrates an operation 800 of a load balancing mechanism for data storage system 100 according to various implementations of the invention. In a decision operation 810, processor 120 determines whether to create a new spill space container 135N or a new split space container 155N. If a new split space container 155N is to be created, processing continues at an operation 820; if a new spill space container 135N, processing continues at an operation 850.

In an operation 820, processor 120 determines which data storage asset(s) 710 hosts the fewest number of data storage containers 720. In a decision operation 830, processor 120 determines whether two or more data storage assets 710 host the fewest number of data storage containers 720. If so, processing continues at an operation 835. If not, processing continues at an operation 890.

In operation 835, processor 120 selects one of the two or more data storage assets 710 to host the new split space data storage container 155N. In an operation 840, processor 120 creates a new data storage container 720 (corresponding to new data storage container 155N) on the selected data storage asset 710.

In an operation 890, processor 120 selects the single determined data storage asset 710 to host the data storage container 720, and processing continues at operation 840.

In an operation 850, processor 120 determines which data storage asset(s) 710 hosts the farthest of the closest data storage containers 710. In a decision operation 860, if two or more data storage assets 710 host the farthest of the closest data storage container 710, then processing continues at an operation 870; otherwise processing continues at operation 890. In operation 870, processor 120 determines which data storage asset(s) 710 hosts the fewest number of data storage containers 710. In a decision operation 880, if two or more data storage assets 710 host the fewest number of data storage containers 710, then processing continues at an operation 835 where one of them is selected; otherwise processing continues at operation 890.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as would be understood.

What is claimed is:

1. A method for load balancing in a data storage system, the data storage system having a plurality of data storage assets, each of the plurality of data storage assets configured to host a plurality of data storage containers, the method comprising:

receiving, via a computing processor, a request to create a new data storage container on one of the plurality of data storage assets, the new data storage container to store new data records when an existing data storage container fills, wherein each of the plurality of data storage assets is configured to host a plurality of data storage containers;

determining which of the plurality of data storage assets is farthest away from the existing data storage container corresponding to the new data storage container is being created;

creating the new data storage container on the data storage asset that is farthest away from the existing data storage container, wherein determining which of the plurality of data storage assets is farthest away from the existing data storage container comprises determining whether the existing storage container is a spill space storage container or a split space storage container, when the existing data storage container is a split space storage container, the determining which of the plurality of data storage assets is farthest away from the existing data storage container comprises determining which of the plurality of data storage assets hosts a fewest number of data storage containers, and when the existing data storage container is a spill space data storage container, the determining which of the plurality of data storage assets is farthest away from the existing data storage container comprises determining which of the plurality of data storage assets hosts a farthest of a plurality of closest data storage containers.

2. The method of claim 1, wherein determining which of the plurality of data storage assets is farthest away from an existing data storage container corresponding to the new data storage container comprises:

determining which of the plurality of data storage assets hosts a farthest of a plurality of closest data storage containers.

3. The method of claim 2, wherein determining which of the plurality of data storage assets hosts a farthest of a plurality of closest data storage containers comprises:

determining a closest data storage container that is hosted on each of the plurality of data storage assets; and determining which one of the plurality of data storage assets hosts a farthest one of the closest data storage containers.

4. The method of claim 3, wherein when two or more of the plurality of data storage assets are determined to host the farthest of the closest data storage containers, determining which of the two or more of the plurality of data storage assets hosts a fewest number of data storage containers.

5. The method of claim 4, wherein when two or more of the plurality of data storage assets are determined to host the fewest number of data storage containers, selecting any one of such two or more of the plurality of data storage assets to host the new data storage container.

6. The method of claim 3, wherein when two or more of the plurality of data storage assets are determined to host the farthest of the closest data storage containers, determining which of the two or more of the plurality of data storage assets hosts a least amount of data or data records.

7. The method of claim 1, wherein determining which of the plurality of data storage assets is farthest away from an existing data storage container corresponding to the new data storage container comprises:

determining which of the plurality of data storage assets hosts a fewest number of data storage containers.

8. The method of claim 1, wherein determining which of the plurality of data storage assets is farthest away from an existing data storage container corresponding to the new data storage container comprises:

determining which of the plurality of data storage assets hosts a least amount of data.

9. The method of claim 1, wherein determining which of the plurality of data storage assets is farthest away from an existing data storage container corresponding to the new data storage container comprises:

determining which of the plurality of data storage assets hosts a least amount of data records.

10. The method of claim 1, wherein determining which of the plurality of data storage assets is farthest away from an existing data storage container corresponding to the new data storage container comprises:

determining which of the plurality of data storage assets host data storage containers that are farthest away from the existing data storage container for a same customer.

11. The method of claim 1, wherein determining which of the plurality of data storage assets is farthest away from an existing data storage container corresponding to the new data storage container comprises:

determining which of the plurality of data storage assets host data storage containers that are farthest away from the existing data storage container for a same user.

12. The method of claim 1, wherein determining which of the plurality of data storage assets is farthest away from an existing data storage container corresponding to the new data storage container comprises:

determining which of the plurality of data storage assets host data storage containers that are farthest away from the existing data storage container based on common information in one or more data records included in the data storage containers and the existing data storage container.

13. A method for load balancing in a data storage system, the data storage system having a plurality of data storage assets, each of the plurality of data storage assets configured to host a plurality of data storage containers, the method comprising:

receiving, via a computing processor, a request to create a new data storage container on one of the plurality of data storage assets, the new data storage container to store new data records when an existing data storage container fills, wherein each of the plurality of data storage assets is configured to host a plurality of data storage containers;

determining whether the existing storage container corresponds to a sequential data storage space or a finite data storage space;

when the existing data storage container corresponds to the finite data storage space:

determining which of the plurality of data storage assets hosts a fewest number of data storage containers, and creating the new data storage container on the determined one of the plurality of data storage assets that hosts the fewest number of data storage containers; and when the existing data storage container corresponds to the sequential data storage space:

determining which of the plurality of data storage assets hosts a farthest of a plurality of closest data storage containers, and creating the new data storage container on the determined one of the plurality of data storage assets that hosts the farthest of the plurality of closest data storage containers.

\* \* \* \* \*